United States Patent [19]

Whitehouse

[11] Patent Number: 4,488,604
[45] Date of Patent: Dec. 18, 1984

[54] TORQUE CONTROL CLUTCH FOR A POWER TOOL

[75] Inventor: Hugh L. Whitehouse, Lyndhurst, Ohio

[73] Assignee: The Stanley Works, New Britian, Conn.

[21] Appl. No.: 397,472

[22] Filed: Jul. 12, 1982

[51] Int. Cl.$^3$ .................. B23Q 5/00; F16D 43/22
[52] U.S. Cl. ........................... 173/12; 81/469; 192/0.034
[58] Field of Search ............. 173/12, 15, 163; 192/0.034, 150; 81/57.31, 57.11, 57.14, 469

[56] References Cited

U.S. PATENT DOCUMENTS

| | | | |
|---|---|---|---|
| 3,195,704 | 7/1965 | Linsker | 192/150 |
| 3,275,116 | 9/1966 | Martin | 173/12 X |
| 3,276,524 | 10/1966 | Falter | 173/12 X |
| 3,398,611 | 8/1968 | Hahner | 173/12 X |
| 3,477,521 | 11/1969 | Kiester et al. | 173/15 X |
| 4,191,282 | 3/1980 | Schoeps | 192/0.034 |

*Primary Examiner*—E. R. Kazenske
*Assistant Examiner*—Willmon Fridie, Jr.
*Attorney, Agent, or Firm*—Hayes & Reinsmith

[57] ABSTRACT

A power drive control unit of a torque control clutch for a fluid operated power tool features a latch, operable for initiating and interrupting motive fluid flow to a rotary fluid motor, and an actuator pin for controlling the latch. The latch is carried on a drive spindle rotatable in synchronism with a driven clutch part and is supported for rotation on that drive spindle. The actuator pin is carried on a driving clutch part for actuating the latch upon relative movement between the driving and driven clutch parts at a predetermined output torque for moving the latch into position to interrupt fluid flow to the motor within less than a single revolution of relative movement between the driving and driven clutch parts.

18 Claims, 7 Drawing Figures

TORQUE CONTROL CLUTCH FOR A POWER TOOL

FIELD OF THE INVENTION

This invention generally relates to fluid operated rotary power tools and particularly concerns a torque control clutch which precisely limits angular displacement of a rotary drive for such a tool upon its output torque reaching a desired predetermined value as sensed by the clutch.

BACKGROUND OF THE INVENTION

The subject invention may be incorporated in various types of fluid operated rotary power tools having a variety of different applications. A typical application is the use of the torque control clutch of this invention in an air operated screwdriver, e.g., in bench assembly of electric and electronic gear. Such tools must be highly reliable over hunderds of thousands of cycles in addition of being durable and readily adjustable to deliver a predetermined torque applied to a fastener by the tool during its operation.

Known fastener setting power tools frequently utilize clutch mechanisms in the tools, such as screwdrivers, many of which mechanisms are spring and cam arrangements. Under torque load, a cam between the driving and driven clutch parts, with or without rollers, is utilized to move the clutch members in an axial direction against an adjustable spring force. Such clutch members disengage and re-engage, sometimes providing an impacting effect. Other such tools utilize latch and push rod arrangements for shutting off the tool.

The disadvantages of such known devices include kinetic inertial effects in the disengaging members, such as a clutch part being accelerated axially by a cam against a spring, and these inertial effects are undesirably reflected in the output torque applied by the tool. Simply stated, most such clutches provide a dynamic output torque higher than their static disengaging torque. In addition, certain known tools, while reliable and providing accurate clutch action, are unduly structurally complex and present difficulties and time consuming efforts to service the tools.

SUMMARY OF THE INVENTION

In accordance with this invention, the above disadvantages have been overcome in a highly durable, accurate and reliable power tool which utilizes a reduced number of parts which are relatively economical to manufacture and assemble and is particularly designed to afford quick and easy adjustment and service.

More specifically, the tool of this invention utilizes a frictional-contact type clutch providing a drive connection between a rotary input and a rotary output of the tool and features a power drive control unit for activating tool shut off at a predetermined output torque as established by the clutch. Moreover, the power drive control unit of the clutch is operable for activating tool shut off and for limiting the power input drive rotation, in a selected angular direction, to a displacement less than one revolution for highly effective and accurate applications, such as fastener torquing, in a compact tool envelope wherein kinetic inertial effects of declutching are disassociated from the tool shut-off function.

A simplified latch and release pin arrangement is utilized in the power drive control unit of the torque control clutch of this invention wherein, upon initiating an operating cycle, the latch is normally engaged with a push rod controlling an inlet valve in a fluid supply line to the tool. So long as the push rod remains in engagement with the latch, fluid such as air is supplied to a rotary air motor of a tool providing driving power. During a fastener setting operation, e.g., the driving and driven clutch parts rotate in unison. The latch has a free swinging end engageable with the push rod and remains in such engagement during continued synchronous rotation of the driving clutch part and driven clutch part on which the latch is carried. However, once the clutch slips and the driving clutch part rotates relative to the driven clutch part upon delivery of a predetermined applied fastener torque as established by the clutch, a release pin carried by the driving clutch part rotates relative to the latch through an angular path of movement. The latch is disposed in that angular path of release pin movement. The pin accordingly engages the latch in less than one revolution of the driving clutch part and drives the latch into a nonaligned position relative to the push rod which then moves under a biasing force to drive the inlet valve into a closed flow position.

Another feature of this invention provides for automatically resetting the latch in its operating position aligned with the push rod so that the latch, upon initiation of each operating cycle, drives the push rod controlling the inlet valve into a drive activating position wherein the inlet valve is in an opened flow position to effect tool operation.

Other objects will be in part obvious and in part pointed out in more detail hereinafter.

A better understanding of the objects, advantages, features, properties and relations of the invention will be obtained from the following detailed description and accompanying drawings which set forth an illustrative embodiment indicative of the way in which the principle of the invention is employed.

DESCRIPTION OF A PREFERRED EMBODIMENT

Figure 1A:
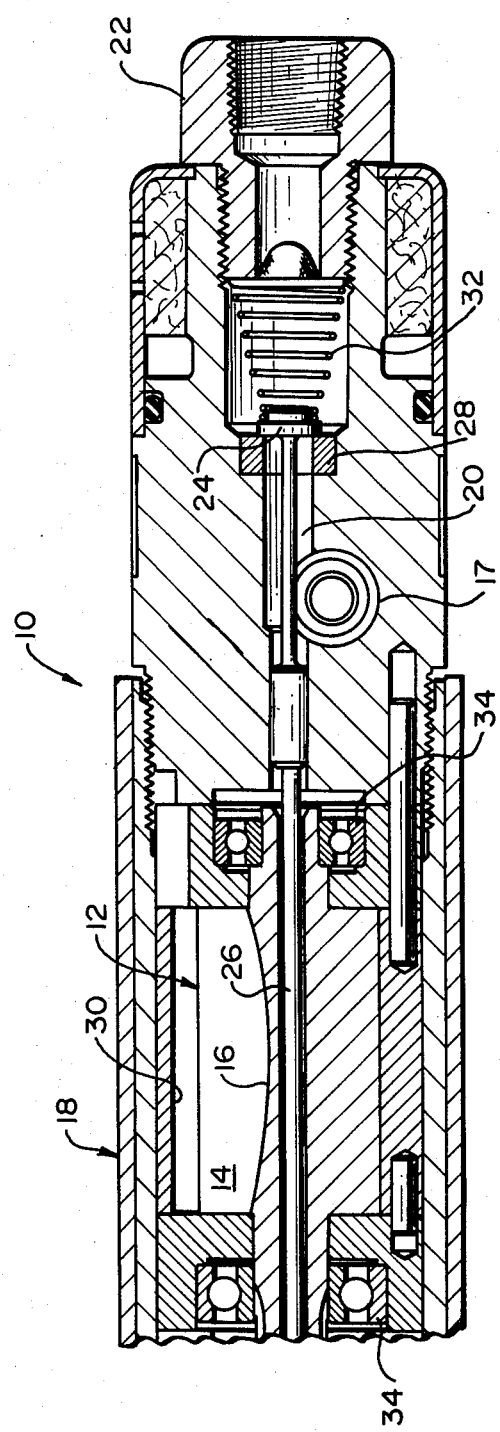
FIG. 1A and FIG. 1B are side views, partly in section and partly broken away, of a power tool incorporating this invention, showing the tool in condition for initiating a tool cycle.

Referring to the drawings in detail, a power tool 10 is shown having a motor 12 which, in the illustrated embodiment, is a reversible air motor which will be understood to be connected to a suitable source of compressed air, not shown, for rotating vanes 14 of rotor 16 in a selected direction as determined by an appropriate reversing valve 17 and associated passages, not shown, the details of which are not necessary for an understanding of this invention. An inlet end of an elongated tool housing, generally designated 18, has an air supply passage 20 downstream of an inlet coupling 22, and an inlet valve 24 is shown mounted on an end of a push rod 26 for movement toward and away from a valve seat 28 in the supply passage 20 which will be understood to lead to motor compartment 30. The push rod 26 and inlet valve 24 are shown in FIG. 1A as being resiliently biased toward an opposite output end of tool 10 by a coiled return spring 32 with the inlet valve 24 in a normally closed position.

Rotor 16 is suitably supported by bearings 34 for rotation about a major longitudinal axis of housing 18 and is drivingly connected through a conventional gear train 36 to a male driving clutch part or driver 38. Clutch driver 38 is coaxially aligned in downsteam relation to rotor 16 and has a reduced input end 40 centrally disposed within the confines of housing 18 in driving engagement with the output of gear train 36. A downsteam output end of clutch driver 38 is received within an output clutch holder or driven clutch part 42.

Figure 1B:
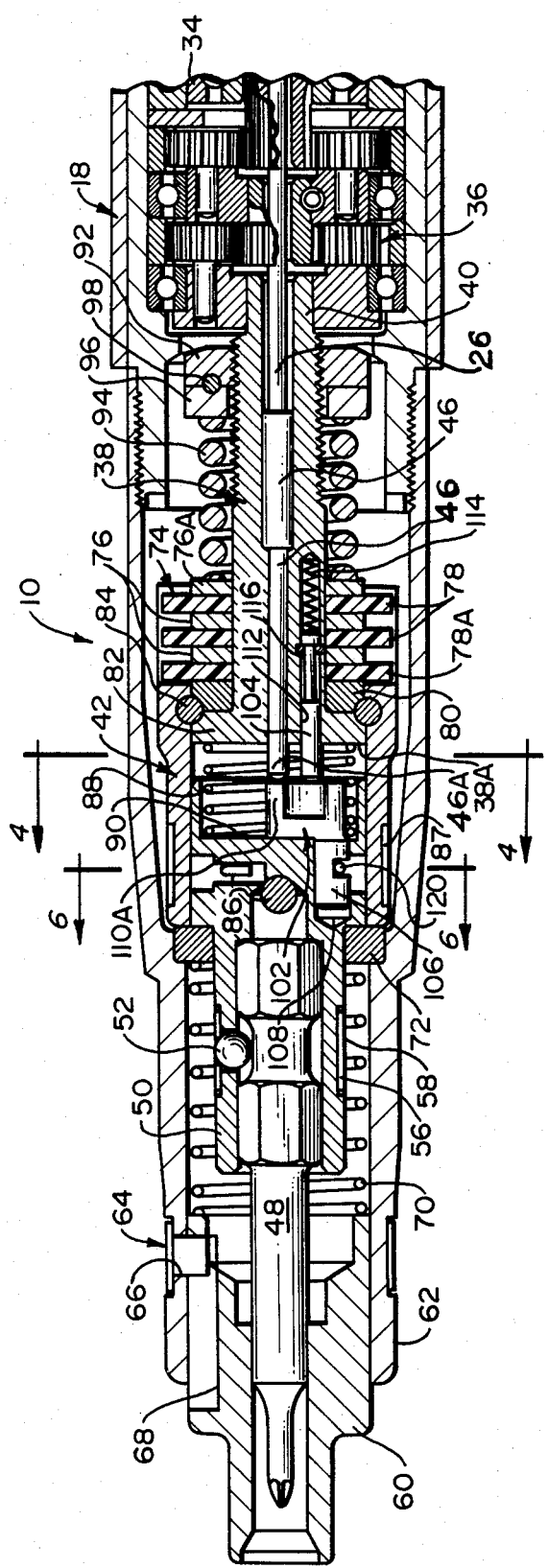

As illustrated, push rod 26 extends axially through rotor 16 to pin 46. With tool 10 in rest condition, as illustrated in FIGS. 1A and 1B, terminal end 46A of latch pin 46 projects beyond face 38A of clutch driver 38 and inlet valve 24 is in its normally closed position. Inlet valve 24, push rod 26 and latch pin 46, while separate components, are in axially aligned relation to one another. By virtue of such construction, push rod 26 may be of a preselected length to take up tolerances as well as being readily adapted for different tools of varying axial lengths.

While this invention is applicable to a variety of different power tools, in the specifically illustrated embodiment, air tool 10 is a push-to-start shut off type tool shown having a screwdriver hex shank bit 48 secured within a drive spindle 50 coaxially mounted for reciprocating movement within driven clutch part 42. Bit 48 is retained within spindle 50 by a ball 52 received within a spindle opening and pressed into bit retaining groove 56 by a releasable bit clip 58.

The illustrated construction additionally provides a fastener finder sleeve 60 wherein a work engaging end of bit 48 is housed for fastener engagement. Sleeve 60 is supported within a clutch hood 62, forming a terminal portion of housing 18, by a finder clip assembly 64 mounted on hood 62 to project inwardly through opening 66 into a registering, longitudinally extending slot 68 in sleeve 60, whereby sleeve 60 is retained against undesired rotation relative to housing 18, but is permitted to move axially against the biasing force of a finder return spring 70. The latter has its opposite ends seated against an inner axial end of sleeve 60 and a bushing 72 secured within housing 18. As shown, sleeve 60 normally is urged into its illustrated extended position (FIG. 1B) by spring 70 whereby bit 48 is normally maintained in its entirety within the confines of sleeve 60 and surrounding hood 62 with the tool 10 in rest condition.

To establish a predetermined fastener applied torque, clutch parts 38, 42 are provided with a frictional-contact axial disk clutch 74 wherein alternate steel disks 76 are fixed to clutch driver 38 and intermediate disks 78, formed of a suitable plastic, e.g., are secured to driven clutch part 42. A suitable bearing race 80 is sandwiched between a radially outwardly extending flanged end 82 of clutch driver 38 and the first outer clutch disk 78A, the bearing race 80 being rotatably supported by suitable bearing balls such as illustrated at 84.

It is to be understood that a drive pin (such as illustrated in cross section at 86 in FIG. 1B) extends diametrically through drive spindle 50 and into axially extending slots, not shown, in the driven clutch part 42 in driving engagement therewith. Accordingly, drive spindle 50 rotates in unison with rotating movements of the drive clutch part 42 while permitting relative axial movement of drive spindle 50 toward and away from flanged end 82 of clutch driver 38. A suitable spring clip 87 is closely fitted to circumferentially extend about driven clutch part 42 to retain drive pin 86 in position, and a drive spindle reset spring 88 is shown having one end seated within a cup shaped recess 90 of drive spindle 50 with an opposite end of the spring 88 seated against the face of the flanged end 82 of clutch driver 38 for continuously urging spindle 50 into its normally extended inoperative position illustrated in FIG. 1B.

Frictional-contact axial disk clutch 74 is particularly suited for the illustrated fastener setting application over many hundreds of thousands of cycles because of its freedom from centrifugal effects and the large frictional area which can be installed in a small space and its favorable heat dissipation characteristics. Clutch 74 is readily adjusted by nut 92 shown threaded onto an externally threaded rear shank portion of clutch driver 38, and a desired pressure distribution can be effected between the surfaces of the friction disks 76, 78 to establish a torque at the output of tool 10 at predetermined values by selectively compressing a clutch compression spring 94 seated against inner clutch disk 76A and a detent washer 96 in underlying contact engagement with adjustment nut 92. Nut 92 is releasably secured against unintended rotation by suitable detent balls such as that illustrated at 98 received within registrable detent dimples in confronting faces of the detent washer 96 and adjustment nut 92. Ready access for adjustment is provided by the illustrated threaded connection between the housing clutch hood portion 62 and its mating main housing 18.

It is to be understood that the specific type of clutch utilized in a tool incorporating this invention is not critical and that other clutches, such as an axially loaded frictional-contact cone clutch, could be effectively utilized within the scope of the teachings of this invention.

In accordance with one aspect of this invention, to effect a significantly simplified yet exceedingly durable and reliable torque control clutch for terminating a tool operating cycle at a predetermined fastener applied torque as determined by that clutch, a compact latch pin, latch, and release pin arrangement is featured in a power drive control unit 100 incorporated in the clutch 74 which has been found to operate satisfactorily over extended periods of time under demanding conditions for high production fastener setting operations. More specifically, a latch 102 of generally L-shaped cross section is illustrated as being carried on drive spindle 50, and a cooperating latch release pin 104 is carried on clutch driver 38. Latch 102 includes a depending pivot pin 106 supported in an opening 108 which extends parallel to the major longitudinal axis of the tool 10 (and drive spindle 50) adjacent the spindle periphery. A latch lever 110 is integrally formed on a projecting end of pivot pin 106 and has a free swinging end 110A which, in its normal operating position, extends diametrically within the cup shaped recess 90 of drive spindle 50 (FIG. 4) to a position in alignment with both the major longitudinal tool axis and latch pin 46. With the tool 10 at rest, as in FIGS. 1A and 1B, the swinging end 110A of latch 102 is spaced apart axially from the latch pin 46 in its illustrated drive de-activating position extended beyond the face 38A of flanged end 82 of clutch driver 38. Release pin 104 is received in an opening 112 exposed in the face of clutch driver 38 and extends in parallel relation to latch pin 46. Pin 104 is radially offset approximately equidistant from the major longitudinal axis of the tool 10 and the pivot axis of the latch 102, established by its pin 106, when the noted components are diametrically aligned as viewed in FIG. 4.

Figure 3:
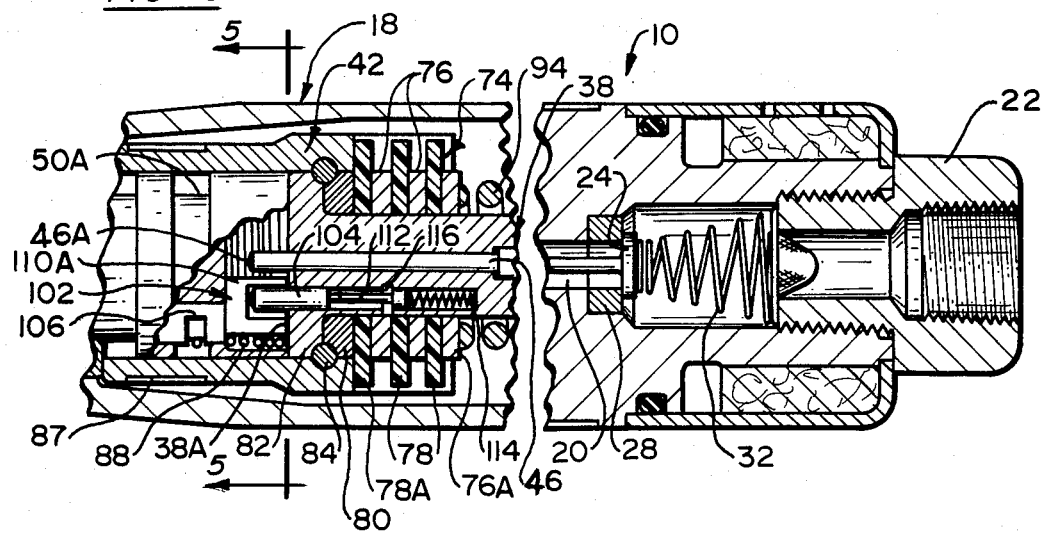
FIG. 3 is a side view, partly broken away and partly in section, showing certain clutch components of the tool of FIG. 1A and FIG. 1B at shut off prior to the tool being reset.

To maintain the release pin 104 within its opening 112 and to provide a stop against a biasing force of a coil spring 114 received within opening 104 and acting against a head of release pin 104 to urge it into a normally extended latch release position (FIGS. 1B and 3) to project beyond the face of the clutch driver flanged end 82, a retaining key 116 is secured within clutch driver opening 112 in fixed relation thereto while permitting axial reciprocation of pin 104. In its latch release position, pin 104 is disposed with its exposed terminal end approximately in the same radial plane containing an exposed terminal end of latch pin 46 in its illustrated drive de-activating position with inlet valve 24 in normally closed position.

Figure 4:
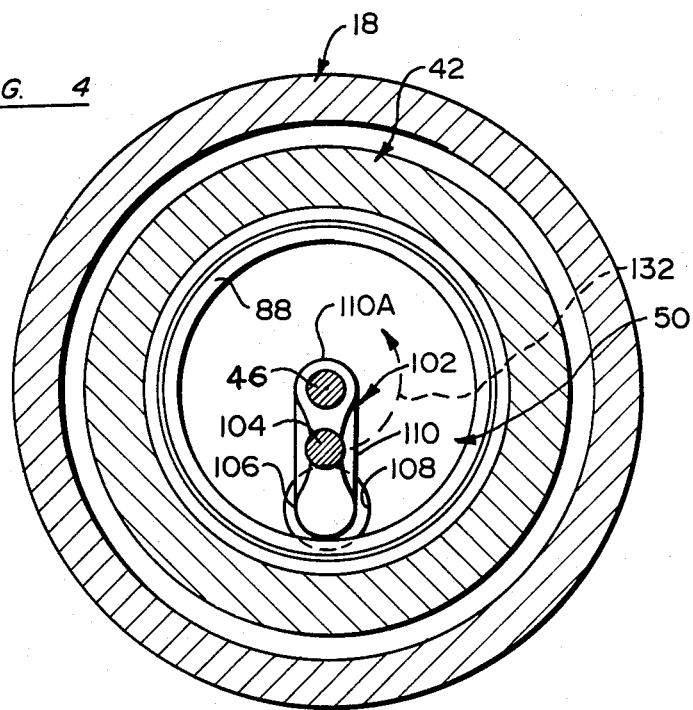
FIG. 4 is an enlarged cross sectional view taken generally along line 4—4 of FIG. 1B.
Figure 6:
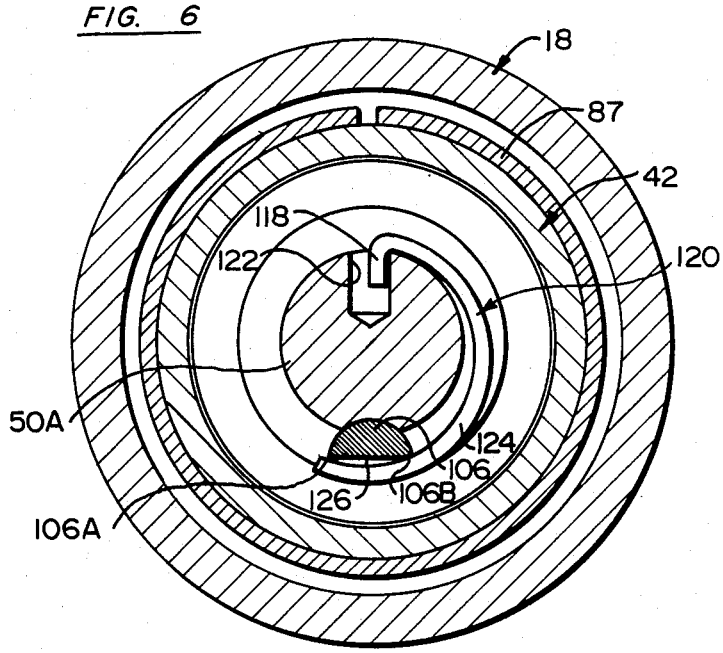
FIG. 6 is an enlarged cross sectional view taken generally along line 6—6 of FIG. 1B.

As best seen in FIG. 6, another feature of latch 102 of this invention is illustrated wherein a radially directed tang 118 of a wire formed spring 120 is received in a radially inwardly directed opening 122 in a reduced diameter intermediate portion 50A of drive spindle 50. An arcuate shank 124 of spring 120 extends about that intermediate drive spindle portion 50A through a cutout 126 in the latch pivot pin 106 intermediate its ends. Cutout 126 is so designed that opposite diametrical contact edges 106A and 106B of the latch pivot pin 106 are engageable with the spring 120 and subject to its biasing force to automatically center the latch pivot pin 106 and thereby position its swinging free end 110A in dead center alignment with latch pin 46 and the major longitudinal axis of drive spindle 50 (FIGS. 4 and 6). In the illustrated embodiment, opposed sides of the latch lever 110 are preferably shown as being chamfered for minimizing friction and consequent wear on the pin and latch contact surfaces over extended periods of service.

Figure 2:
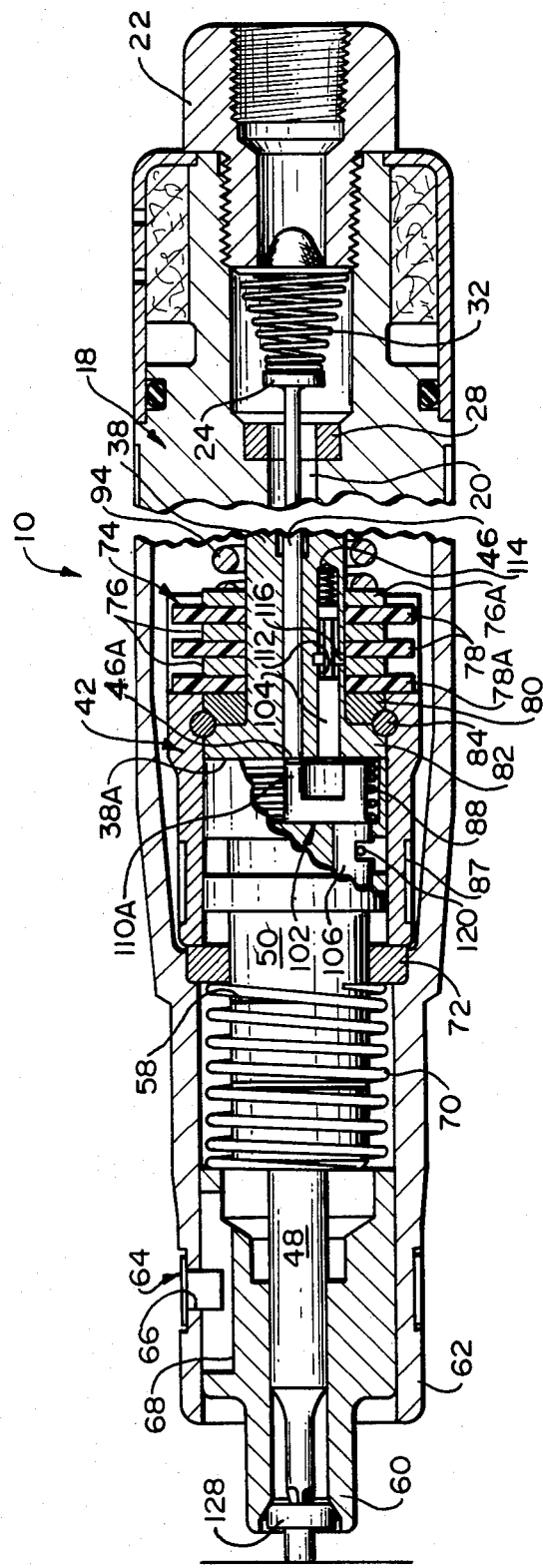
FIG. 2 is a side view, partly in section and partly broken away, showing the tool of FIG. 1A and FIG. 1B during a fastener setting operation.

By virtue of the above described construction, the air tool 10 may be oriented with the screwdriver bit 48 in alignment with a fastener such as 128 (FIG. 2). Upon pressing housing 18 toward fastener 128, sleeve 60 is driven against its return spring 70 permitting engagement of bit 48 with the fastener 128. The bit 48, in turn, is pressed and driven toward the inlet end of tool 10 in unison with its associated drive spindle 50, compressing reset spring 88 between spindle 50 and clutch driver 38. Driving engagement is thus effected between the previously automatically centered latch 102 at its free swinging end 110A with latch pin 46 which in turn drives push rod 26 to overcome the force of return spring 32 and drive the inlet valve 24 into its opened flow position (FIG. 2). Communication is accordingly established between the air motor and its source of compressed air through supply passage 20. Consequent air motor operation rotates clutch driver 38 in a selected angular direction as determined by reversing valve 17, via gear train 36, and the axial disk clutch 74 rotates the driven clutch part 42 in unison with the clutch driver 38. The clutch driver 38, the driven clutch part 42 and drive spindle 50, through its drive pin connection, rotate in unison to accordingly rotate the tool bit 48 to set fastener 128.

In the disclosed construction, were the release pin 104 precisely located in alignment with the latch 102 at the initiation of an operating cycle as shown in FIG. 4, the release pin 104 simply telescopes into its clutch driver opening 112 (FIG. 2) simultaneously with the inlet valve opening movement of the latch pin 46. Thereafter during a fastener setting operation, the release pin 104 and latch 102 rotate in synchronism with their respective elements, namely, the clutch driver 38 and drive spindle 50. Such action is effected regardless of the relative latch and release pin orientation at the commencement of a tool operating cycle.

Figure 5:
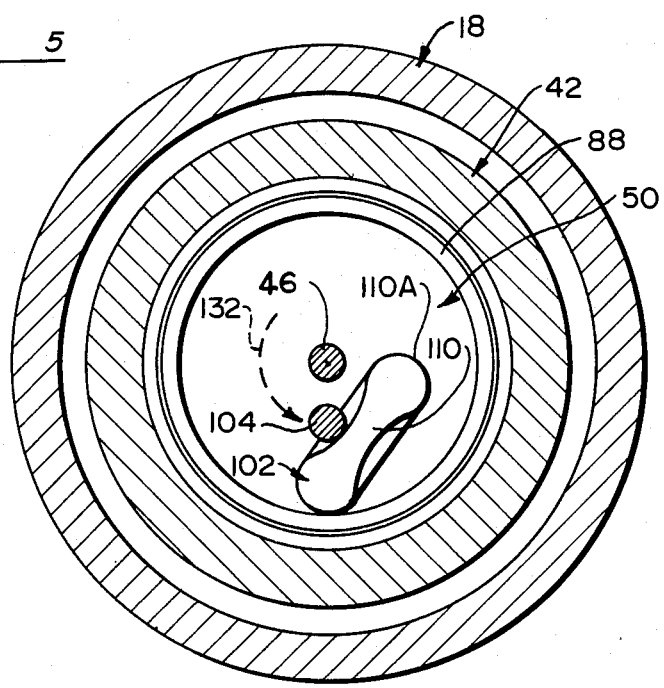
FIG. 5 is an enlarged cross sectional view taken generally along line 5—5 of FIG. 3.

Upon fastener 128 being set to a predetermined torque established by the frictional-contact clutch 74, the clutch driver 38 will rotate or "slip" relative to its driven clutch part 42, drive spindle 50 and bit 48. Accordingly, release pin 104 immediately rotates relative to latch 102, slipping off the latch surface (were pin 104 in telescoped position within opening 112) under the biasing force of spring 114, and within less than a single revolution of clutch driver 38 relative to spindle 50, pin 104 moves through an angular path of movement wherein latch 102 is disposed, engages the latch 102 and moves it out of alignment with the latch pin 46, as depicted, e.g., by broken line arrow 132 showing an extreme counterclockwise angular throw of release pin 104 from its initial position (FIG. 4) into latch contact position (FIG. 5). Immediate tool shut-off is thus effected upon push rod release, whereupon its return spring 32 drives inlet valve 24 into its normally closed position, terminating the motive power to air motor 12 and providing precision torquing of fastener 128 to a desired tightness.

Removal of tool 10 from fastener 128 thereafter permits springs 70 and 88 to restore the sleeve 60 and drive spindle 50 to their normally extended inoperative positions as illustrated in FIG. 1B. This movement permits reset spring 120 to automatically center the swinging free end 110A of latch 102 in dead center alignment with the projecting end of latch pin 46, conditioning tool 10 for the next operating cycle.

As will be apparent to persons skilled in the art, various modifications, adaptations and variations of the foregoing specific disclosure can be made without departing from the teaching of this invention.

I claim:

1. A power tool comprising a fluid operated motor and rotary drive input drivingly connected to the motor, a rotary drive output rotatable about an axis coincident with that of the rotary drive input, clutch means normally establishing a releasable unitary drive connection between the drive input and drive output and providing relative angular slipping movement therebetween at a predetermined output torque, a power drive control unit including a latch movable between operating and power shutoff positions about a pivot axis extending in parallel relation to the rotational axes of the drive input and drive output, the latch in operating position being operable for establishing motor operation, and a rotary actuator movable in an angular path of movement containing the latch, the rotary actuator being operable responsive to relative angular slipping movement between the drive input and drive output at said predetermined output torque to move the latch from operating position to power shutoff position.

2. The tool of claim 1 wherein the clutch means is a frictional-contact clutch having rotary driving and driven clutch parts respectively connected in driving relation to the drive input and drive output, the actuator including a pin mounted in the driving clutch part.

3. The tool of claim 2 wherein the latch is axially movable relative to the driving clutch part between starting and operating positions, wherein the latch is supported for rotary movement in synchronism with the driven clutch part, and wherein the latch is supported for movement about its pivot axis in opposite angular directions relative to the driven clutch part.

4. The tool of claim 2 wherein the actuator pin is mounted for telescoping axial movement within the driving clutch part.

5. A power tool comprising a fluid operated motor and rotary drive input drivingly connected to the motor, a rotary drive output, a frictional-contact clutch having rotary driving and driven clutch parts respectively connected in driving relation to the drive input and drive output for normally establishing a releasable unitary drive connection between the drive input and drive output and providing relative slipping movement therebetween at a predetermined output torque, a power drive control unit including a latch movable between operation and power shutoff positions, the latch in operating position being operable for establishing motor operation, the latch being axially movable relative to the driving clutch part between starting and operating positions, the latch being supported for rotary movement in synchronism with the drive clutch part and for pivotal movement in opposite angular directions relative to the driven clutch part, and a rotary actuator including a pin mounted in the driving clutch part and movable in an angular path of movement containing the latch, the actuator pin being supported in the driving clutch part for reciprocating axial movement in offset parallel relation to the rotational axis of the driving clutch part, the rotary actuator being operable responsive to relative slipping movement between the drive input and drive output at said predetermined output torque to move the latch from operating position to power shutoff position.

6. The tool of claim 5 wherein the latch is axially movable in parallel relation to the rotational axes of the driving and driven clutch parts between a starting position in spaced relation to the driving clutch part and said operating position in adjacent relation thereto, wherein the actuator pin is resiliently biased toward the latch and is telescopically retractable within the driving clutch part by engagement of the latch by axial movement thereof from starting to operating positions, the actuator pin being automatically axially extendible from its telescopically retracted position within the driving clutch part, upon relative movement of the driving and driven clutch parts, into the radial plane of the latch for driving the latch from its operating to shutoff positions.

7. The tool of claims 5 or 6 wherein the latch is supported for rotation about an axis in offset parallel relation to the rotational axis of the driving clutch part and the axis of reciprocation of the actuator pin.

8. The tool of claim 7 wherein the latch includes a lever having a swinging free end, wherein the latch is resiliently biased into its operating position with its swinging free end normally aligned with the rotational axis of the driving clutch part, wherein an inlet valve is provided for controlling fluid flow to the motor, and wherein a push rod is drivingly connected to the inlet valve and supported for reciprocating movement in coaxial alignment with the rotational axis of the driving clutch part, the push rod being resiliently biased toward an output end of the tool establishing its inlet valve in a normally closed fluid flow position, the latch in its normal operating position being axially movable for moving the push rod away from the output end of the tool for moving its inlet valve into an opened flow position.

9. A power tool comprising a fluid operated motor and rotary drive input drivingly connected to the motor, a rotary drive output, a frictional-contact clutch having rotary driving and driven clutch parts respectively connected in driving relation to the drive input and drive output, said clutch normally establishing a releasable unitary drive connection between the drive input and drive output and providing relative slipping movement therebetween at a predetermined output torque, a power drive control unit including a latch movable between operating and power shutoff positions, the latch in operating position being operable for establishing motor operation, and a rotary actuator including a pin mounted in the driving clutch part and movable in an angular path of movement containing the latch, the rotary actuator being operable responsive to relative slipping movement between the drive input and drive output at said predetermined output torque to move the latch from operating position to power shutoff position, the latch being supported for rotation about an axis in offset parallel relation to the rotational axis of the driving clutch part and the axis of reciprocation of the actuator pin.

10. The tool of claim 9 wherein the latch includes a lever having a swinging free end, wherein the latch is resiliently biased into its operating position with its swinging free end normally aligned with the rotational axis for the driving clutch part, wherein an inlet valve is provided for controlling fluid flow to the motor, and wherein a push rod is drivingly connected to the inlet valve and supported for reciprocating movement in coaxial alignment with the rotational axis of the driving clutch part, the push rod being resiliently biased toward an output end of the tool establishing its inlet valve in a normally closed fluid flow position, the latch in its normal operating position being axially movable for moving the push rod away from the output end of the tool for moving its inlet valve into an opened flow position.

11. The tool of claim 10 wherein the drive output includes a drive spindle, wherein the drive spindle, the clutch parts and the drive input are coaxially aligned, and wherein the latch includes a pivot pin rotatably supported on the drive spindle and defining the pivot axis of the latch.

12. The tool of claim 11 wherein the drive spindle is reciprocable along its axis for movement between a normally extended inoperative position in remotely spaced relation to the driving clutch part and a retracted operating position wherein the latch in its normal operating position operates to move the push rod for driving the inlet valve into its opened flow position and, upon actuation by the actuator pin, the latch is moved into shutoff position, releasing the push rod to move the inlet valve into its normally closed fluid flow position.

13. The tool of claim 12 wherein the swinging free end of the latch lever is automatically biased to return into its operating position upon return of the drive spindle into its normally extended inoperative position.

14. An air operated power tool comprising a housing having an air inlet connected to a source of compressed air, an air operated motor having a rotary drive output, an air supply passage between the source of compressed air and the motor, an inlet valve movable within the passage between opened and closed positions for controlling air flow to the motor, a rotary tool output, a friction clutch having a rotary driving clutch part connected to the air motor drive output and a rotary driven clutch part connected to the tool output normally establishing a unitary driving relation between the motor drive output and the tool output while providing relative rotary slipping movement between the driving and driven clutch parts at a predetermined output torque, a push rod drivingly connected to the inlet valve and movable axially within the housing between an operative position wherein the inlet valve is in opened position to establish air flow to the motor and a shutoff position wherein the inlet valve is in closed position interrupting air flow to the motor, a push rod latch pivotable about a pivot axis extending in parallel relation to the rotational axis of the rotary drive output, the latch being pivotable between an operating position, wherein the latch maintains the push rod in operative position, and a release position wherein the push rod is movable to shutoff position, and a latch actuator cooperating with the friction clutch for pivoting the latch from operating position into release position responsive to friction clutch slippage at said predetermined output torque to interrupt air flow to the rotary drive in less than a single revolution of relative rotation between the driving and driven clutch parts.

15. An air operated power tool comprising a housing having an air inlet connected to a source of compressed air, an air operated motor having a rotary drive output, an air supply passage between the source of compressed air and the motor, an inlet valve movable within the passage between opened and closed positions for controlling air flow to the motor, a drive spindle connected to a rotary tool output, a friction clutch having a rotary driving clutch part connected to the air motor drive output and a rotary driven clutch part drivingly connected to the drive spindle for synchronous rotation therewith normally establishing a unitary driving relation between the motor drive output and the tool output while providing relative rotary slipping movement between the driving and driven clutch parts at a predetermined output torque, the drive spindle being axially movable relative to the driven clutch part between an inoperative position and an operating position, a push rod drivingly connected to the inlet valve and movable axially within the housing between an operative position wherein the inlet valve is in opened position to establish air flow to the motor and a shutoff position wherein the inlet valve is in closed position interrupting air flow to the motor, a push rod latch movable between an operating position, wherein the latch maintains the push rod in operative position, and a release position wherein the push rod is movable to shutoff position, the latch being supported on the drive spindle for angular movement between said operating and release positions and for axial movement in synchronism with the drive spindle, and a latch actuator cooperating with the friction clutch for moving the latch from operating position into release position responsive to friction clutch slippage at said predetermined output torque to interrupt air flow to the rotary drive in less than a single revolution of relative rotation between the driving and driven clutch parts.

16. The tool of claim 15 wherein the latch actuator is movable in an angular path of movement during said friction clutch slippage, wherein the latch is disposed within said angular path of movement of the latch actuator when the drive spindle is in operating position.

17. The tool of claim 16 wherein reset means is provided for automatically resetting the latch to its operating position for a subsequent operating cycle of the tool upon the drive spindle assuming its inoperative position, and return means for axially driving the drive spindle into said inoperative position with said latch in spaced relation to said latch actuator.

18. The tool of claim 8 further including a latch pin engageable with the latch, and wherein the push rod is mounted between the inlet valve and latch pin in coaxially aligned, driving engagement therewith.

* * * * *